United States Patent [19]
Panek et al.

[11] Patent Number: 5,311,793
[45] Date of Patent: May 17, 1994

[54] BRAKE CABLE FIXING DEVICE FOR A PARKING BRAKE, IN PARTICULAR FOR A DUO-SERVO HAT-SECTION-TYPE PARKING BRAKE

[75] Inventors: Claus-Peter Panek, Steinbach; Jurgen Musolf, Frankfurt am Main; Uwe Wohlmann, Worth/Main; Wulf Post, Pfungstadt, all of Fed. Rep. of Germany

[73] Assignee: Alfred Teves GmbH, Frankfurt Am Main, Fed. Rep. of Germany

[21] Appl. No.: 930,602
[22] PCT Filed: Feb. 5, 1991
[86] PCT No.: PCT/EP91/00215
§ 371 Date: Sep. 30, 1992
§ 102(e) Date: Sep. 30, 1992
[87] PCT Pub. No.: WO91/15685
PCT Pub. Date: Oct. 17, 1991

[30] Foreign Application Priority Data
Mar. 31, 1990 [DE] Fed. Rep. of Germany .... 4010460.5
Dec. 8, 1990 [DE] Fed. Rep. of Germany ....... 4039274

[51] Int. Cl.$^5$ ............................................... F16C 1/10
[52] U.S. Cl. ............................ 74/502.6; 74/502.4; 74/500.5
[58] Field of Search ............ 74/502.4, 502.6, 501.5 R, 74/500.5; 24/546, 555, 563; 188/2 D

[56] References Cited
U.S. PATENT DOCUMENTS

| | | |
|---|---|---|
| 4,595,084 | 6/1986 | Le Deit ................ 74/502.4 |
| 4,635,761 | 1/1987 | Smith et al. ............ 24/555 X |
| 4,658,907 | 4/1987 | Popp ..................... 24/563 X |
| 4,886,146 | 12/1989 | Copp ...................... 188/2 D |
| 4,889,006 | 12/1989 | Kolinske et al. .......... 74/502.4 |
| 5,039,138 | 8/1991 | Dickirson .............. 74/502.4 X |
| 5,046,380 | 9/1991 | Matsumoto et al. ........... 74/502.4 |
| 5,086,662 | 2/1992 | Tayon et al. .............. 74/502.4 |
| 5,142,935 | 9/1992 | Carr .................... 74/502.4 X |
| 5,154,093 | 10/1992 | Dickirson .............. 74/501.5 R |
| 5,174,170 | 12/1992 | Kato et al. ................ 74/502.6 |

FOREIGN PATENT DOCUMENTS

| | | | |
|---|---|---|---|
| 1253966 | 11/1967 | Fed. Rep. of Germany | 74/502.4 |
| 7116427 | 8/1971 | Fed. Rep. of Germany | 188/2 D |
| 7228610 | 10/1972 | Fed. Rep. of Germany | 74/502.4 |
| 7407338 | 6/1974 | Fed. Rep. of Germany | 74/502.4 |
| 8435833 | 4/1985 | Fed. Rep. of Germany | 74/502.4 |
| 3403990 | 8/1985 | Fed. Rep. of Germany | 74/502.4 |
| 8804606 | 9/1989 | Fed. Rep. of Germany | 188/2 D |

OTHER PUBLICATIONS
PCT International Preliminary Examination Report dated Aug. 11, 1992-P. Asseeff.

*Primary Examiner*—Vinh T. Luong
*Attorney, Agent, or Firm*—Robert P. Seitter; J. Gordon Lewis

[57] ABSTRACT

A brake cable fixing device for the expanding lock of a parking brake is described making possible an easy installation of a brake cable. A tapered cable end nipple of the brake cable is guided during installation by a funnel-shaped entry space, constituted by the outer edges of the fork of an actuating lever and by an elastic leg of a securing element positioned on a forked pressure bracket. Insertion of the cable and nipple deflects the elastic leg of the securing element, allowing the end nipple to pass by, and the restoring force of the elastic leg urges the cable end nipple into position in the fork of the actuating lever. The securing element is described as a spring clasp, having a pair of spring legs connected at a vertex, one spring leg constituting the elastic leg, the other spring leg engaging the endwall of the pressure bracket to mount the securing element thereto.

9 Claims, 2 Drawing Sheets

BRAKE CABLE FIXING DEVICE FOR A PARKING BRAKE, IN PARTICULAR FOR A DUO-SERVO HAT-SECTION-TYPE PARKING BRAKE

BACKGROUND OF THE INVENTION

1. Field of the Invention

This invention is related to a brake cable fixing device for a parking brake (see e.g. Brake Handbook, 9th edition 1985; Bartsch Verlag; page 135).

2. Description of the Related Art

Duo-servo parking brakes are known which are actuated mechanically by means of a cable control. This type of brake is used in vehicles which are equipped with disc brakes at all wheels. It is accommodated in the hat section of the rear wheel disc brake, the brake shoes being urged against a parking brake drum by an expanding lock. The expanding lock is composed of a pressure bracket and an actuating lever which both engaged with a hinge pin. In this configuration, the brake cable is pinned by an ear in the actuating lever. In addition to the hazards presented by the cable which hangs out, the mounting procedure of inserting the brake cable is cumbersome since the cable must be passed through the steering knuckle via the protective bushing into the expanding lock. This procedure is even more difficult if the brake drum has already been installed.

It is therefore the object of the present invention to create a fixing device for a brake cable in which an easy, uncomplicated insertion of the brake cable into the expanding lock of a brake drum is ensured free of the risk of accidents, without necessitating the use of tools.

SUMMARY OF THE INVENTION

In the brake of the aforementioned kind this object is achieved by creating a convergent funnel shaped entry space guiding insertion of the cable defined in part by a securing element comprised of an elastic leg inclined towards the fork legs of an actuating lever to create said convergent entry space.

The inside of the forked legs of a pressure bracket preferably extend along either side of the entry space, providing a side confinement. The elastic leg is able to be deflected to allow a cable end nipple fixed on the cable end to pass by the elastic leg and maneuvered between the fork legs of the actuating lever to secure the cable.

The elastic leg can either be of a width such as to be urged against the outside of both the actuating lever fork legs, or of a narrower width and shorter length so as to pass between the actuating lever fork legs.

The elastic leg is preferably provided by a spring clasp, with the elastic leg comprising one leg of the spring, joined to another spring leg at a vertex.

The other spring leg acts to provide a mount for the securing element, an angled end retained in a slot in the fork end wall of the pressure bracket, or by a snap in fit of an S-shaped end of the other spring leg to the end wall.

The cable end nipple preferably is of tapering shape to further assist insertion and to avoid catching on the fork edges during installation.

DETAILED DESCRIPTION OF THE PREFERRED EMBODIMENTS

Figure 1:
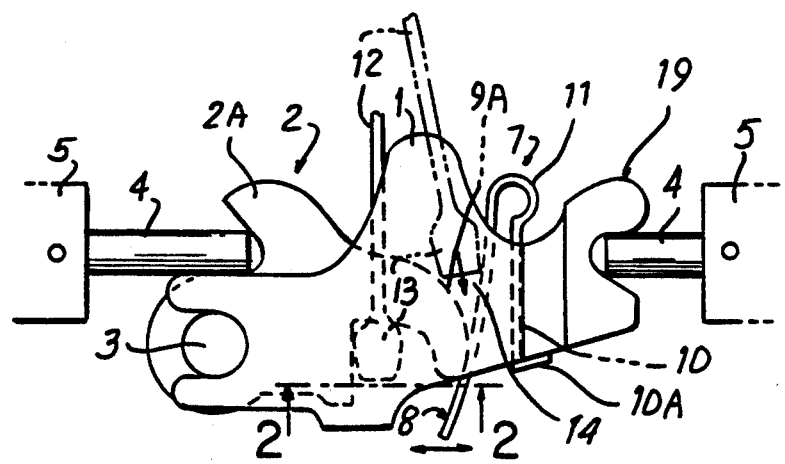
FIG. 1 is a front view of an expanding lock of a duo-servo parking brake and fragmentary view of the associated brake shoe operators, showing in phantom the cable end nipple and brake cable being inserted, with the final position of the cable end nipple and cable in the forked seat of the actuating lever shown in solid and broken lines.

The expanding lock of the duo-servo parking brake is composed of a pressure bracket 1 and of an actuating lever 2 which both are engaged with a hinge pin 3. In this configuration, the pressure bracket 1 and the actuating lever 2 are connected with brake shoes 5 through spacing levers 4 which are respectively in abutment with an actuating end portion 2A of the lever 2 and the end actuating portion 19 of pressure bracket 1 opposite the pin 3.

Figure 2:
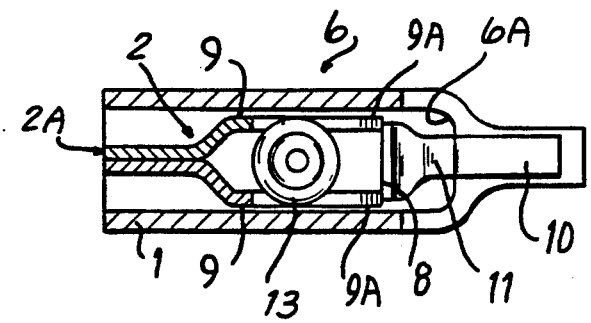
FIG. 2 is an enlarged cross-sectional view taken along the line 2—2 in FIG. 1 as viewed in the direction of the arrows.

As seen in FIG. 2, the pressure bracket 1 and the actuating lever 2 are each forked having oppositely extending pairs of fork legs interfit with each other, the actuating lever 2 fork legs 9 being positioned within the fork legs 6 of the pressure bracket 1. A securing element 7 is arranged in the end wall 6A connecting the fork legs 6. The securing element 7 is in the shape of an open clasp comprised of a pair of spring legs 8, 16 each connected at one end with a vertex 11, having one elastic spring leg 8 urged against the outer ends of the fork legs 9 of the actuating lever 2. The other elastic spring leg 10 opposite the elastic spring leg 8 is angled at its free end 10A and passes beneath the bottom of the connected end wall 6A of the fork legs 6. The offset of the vertex 11 of the securing element and the angled end 10A of the spring leg 10 straddle the end wall 6A of the fork legs 6 of the pressure bracket 1 to create a positive mount.

A cable end nipple 13 is attached to the end of the brake cable 12 and has a conically tapered shape in order to make sure that when the cable 12 is attempted to be inserted into the fork legs 9 of the actuating lever 2 the cable nipple 13 does not catch the edges of the fork legs 9.

During the insertion of the brake cable 12, the cable end nipple 13 will enter a convergent tapering gap 14 defined by the spring leg 8, the inside of the fork 6 of the pressure bracket 1 and the inclined shape of each of the unconnected ends 9A of the fork legs a of the actuating lever 2. The gap convergent 14 thus forms a funnel-shaped entry space. During insertion, the spring leg 8, which is in abutment against the outer end 9A each of the fork legs 9 of the actuating lever 2, will be forced away by the conically tapered cable end nipple 13 of the brake cable 12. When the cable end nipple 13 has passed the outer edges of the fork legs 9 of the actuating lever 2, then the cable end nipple 13 will be pushed in the direction of the fork legs 9 of the actuating lever 2 by the restoring force exerted by the spring leg 8 of the securing element 7. The brake cable 12 and end nipple 13 will thus be finally positioned between the fork legs 9 of the actuating lever 2.

In the event of the first stretching pull of the brake cable 12, the cable end nipple 13 will positively be properly positioned between the fork legs 9.

Figure 3:
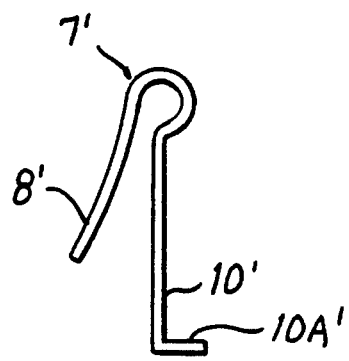
FIG. 3 is a front view of an alternate form of the securing element incorporated in the cable fixing device according to the present invention.

Another form of the securing element 7' is illustrated in FIG. 3.

This form of the securing element 7' with its shorter leg 8' has the advantage that a smaller mounting space is needed, a greater force being, however, required for deflecting the spring leg 8' during mounting of the brake cable 12. In this configuration, the spring leg 8' is sufficiently narrow so as to fit between the two fingers fork legs 9. However, the spring leg 10' must be anchored sufficiently firmly at the end wall 6A of the pressure bracket 1.

When the brake is in the mounted condition, the cable end nipple 13 and brake cable 12 may be released in a simple way, in that upon having removed a rear wheel, the elastic leg 8, is pushed aside with a suitable tool inserted through a bore in the brake drum (not shown), and the cable end nipple 13 may be maneuvered out of the fork 9 of the actuating lever 2.

Figure 4:
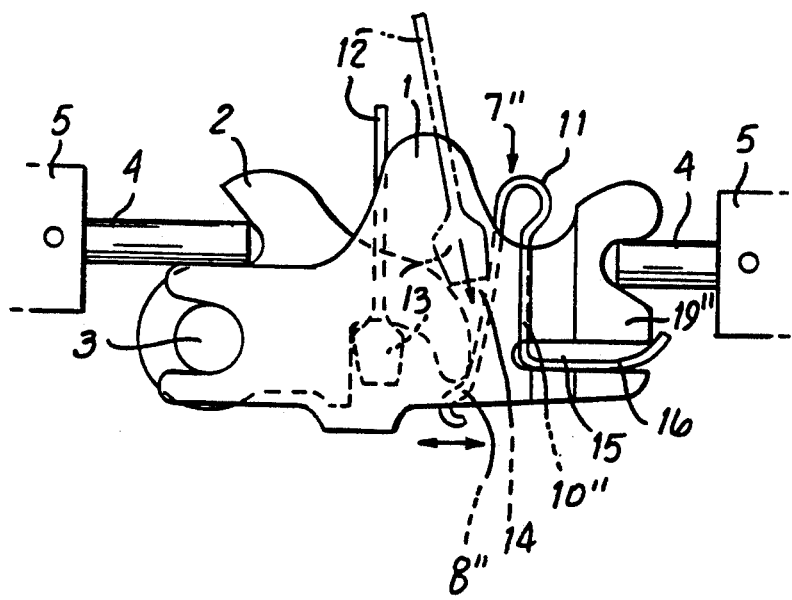
FIG. 4 is a front view of another embodiment of the invention.

In the embodiment illustrated in FIG. 4, the end portion 19" of the pressure bracket 1 engaging the spacing lever 4 of the brake shoe 5, is provided with a slot 15 which extends into the inside of the fork legs 6 of the pressure bracket 1. The spring leg 10" of the securing element 7" is urged against the inside wall of the fork legs 6 and an angled-off second portion is inserted into the slot 15. The free end 16 of the spring leg 10' is angled once again and snaps in at an outer edge of the slot 15.

Figure 5:
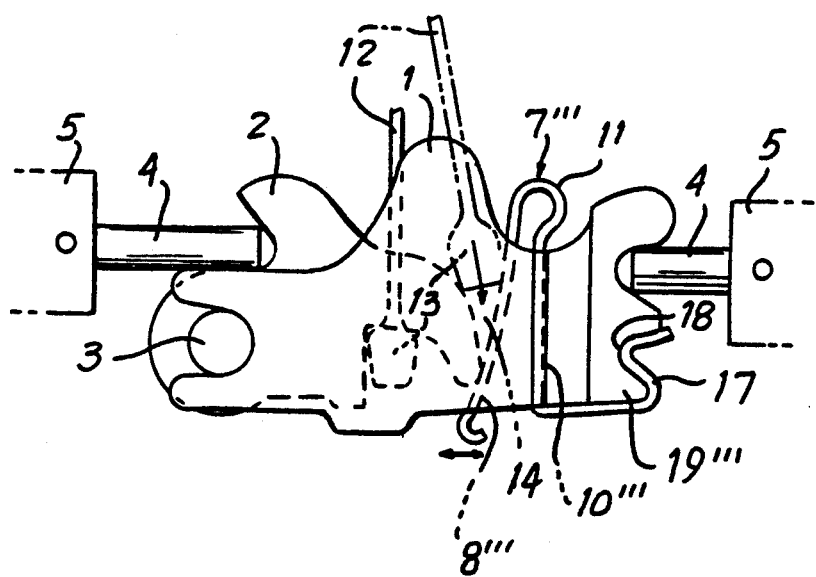
FIG. 5 is a front view of yet another embodiment of the invention.

FIG. 5 shows another possibility, in which the spring leg 10''' snap fitted to the end 19''' of the pressure bracket 1. Herein, the end portion 19''' of the pressure bracket 1 is provided with a recess 18 on its outer side. With its second portion, leg 10''' embraces the end portion 19''' from inwards outwardly and, with its S-shaped free end 17, snaps in the recess 18.

We claim:

1. In combination, a brake cable, parking brake expanding lock, and a cable brake fixing arrangement connecting an end of said brake cable to said parking brake expanding lock, said expanding lock including a pressure bracket comprised of fork legs connected with an end wall at one end thereof comprising an actuating portion, and an actuating lever comprised of fork legs disposed within said pressure bracket fork legs, said actuating lever fork legs spaced apart a predetermined distance and connected at one end with a brake actuating portion, the unconnected end of each of said actuating lever fork legs adjacent said end wall of said pressure bracket and extending at an inclination with respect to said end wall to create a convergent space therebetween;

an elastic leg mounted to said end wall of said pressure bracket and having a free end inclined towards said unconnected end of each of said actuating lever fork legs to create a convergent entry space; a cable end nipple connected to the end of said cable, of a width greater than said distance between said actuating lever fork legs, and said convergent entry space, whereby said cable end nipple can be inserted by deflecting said elastic leg to allow said cable end nipple to pass by and allow said cable to be pushed between said actuating lever fork legs and retained therebetween by said connected cable end nipple.

2. The combination according to claim 1 wherein said elastic leg extends between said fork legs of said actuating lever.

3. The combination according to claim 1 wherein said elastic leg is wider than said distance between said fork legs of said actuating lever and bears against the outside of said fork legs.

4. The combination according to claim 1 wherein said pressure bracket fork legs extend on either side of said convergent entry space to provide a side confinement of said cable end nipple when inserted therein.

5. The combination according to claim 1 wherein said cable end nipple is tapered to assist in insertion into said convergent entry space and prevent catching of the edges thereof.

6. The combination according to claim 1 wherein said elastic leg comprises one leg of a spring clasp having a pair of spring legs connected at a vertex, the other of said spring legs detachable mounted to said end wall of said pressure bracket fork end wall.

7. The combination according to claim 6 wherein said other spring leg is angled at a free end, said angled free end engaging said end wall of said pressure bracket.

8. The combination according to claim 6 wherein said endwall is formed with a slot, said angled free end of said other spring leg received in said slot.

9. The combination according to claim 6 wherein said other spring leg is snap fit to said end wall.

* * * * *